United States Patent
Ikeda et al.

(10) Patent No.: US 8,191,590 B2
(45) Date of Patent: Jun. 5, 2012

(54) STUDLESS TIRE

(75) Inventors: Akio Ikeda, Kobe (JP); Naoki Kageyama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 972 days.

(21) Appl. No.: 12/068,719

(22) Filed: Feb. 11, 2008

(65) Prior Publication Data

US 2008/0196808 A1    Aug. 21, 2008

(30) Foreign Application Priority Data

Feb. 21, 2007    (JP) .................................. 2007-041176

(51) Int. Cl.
*B60C 11/11* (2006.01)
*B60C 11/12* (2006.01)
(52) U.S. Cl. ......... 152/209.18; 152/209.25; 152/209.27; 152/902; 152/DIG. 3
(58) Field of Classification Search ............ 152/209.16, 152/209.18, 209.25, 209.27, 902, DIG. 3; D12/592, 594, 595, 598, 600, 601
See application file for complete search history.

(56) References Cited

U.S. PATENT DOCUMENTS

| | | | | |
|---|---|---|---|---|
| 5,137,068 A | * | 8/1992 | Loidl et al. ............... | 152/209.27 |
| 2005/0167022 A1 | * | 8/2005 | Hashimoto ............... | 152/209.25 |
| 2006/0027296 A1 | | 2/2006 | Tsubono et al. | |
| 2006/0032566 A1 | * | 2/2006 | Koya ........................ | 152/209.18 |
| 2008/0202658 A1 | * | 8/2008 | Ikeda et al. ............... | 152/209.23 |

FOREIGN PATENT DOCUMENTS

| | | | |
|---|---|---|---|
| DE | 19826927 | * | 12/1998 |
| EA | 1520733 A1 | | 3/1995 |
| EP | 0640498 A1 | | 3/1995 |
| JP | 61-226304 | * | 10/1986 |
| JP | 05-139120 | * | 5/1993 |
| JP | 9-323511 A | | 12/1997 |
| JP | 2001-191739 | * | 7/2001 |
| JP | 2002-067624 | * | 3/2002 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A studless tire capable of suppressing a vehicle from staggering at the time of braking on icy and snow-covered roads, including a tread portion 2 provided with at least six block rows R1 to R4, wherein each block B is provided with sipes having a depth of at least 3.0 mm, and the block rows comprises at least two crown block rows CR disposed in a crown region Ac extending from the tire equator C as its center to have a width of 50% of the tread width TW, and at least two shoulder block rows Sh disposed on each axially outer side of the crown block rows CR, and wherein lateral grooves 4 provided in a block row are inclined in the opposite direction, with respect to the axial direction, to lateral grooves provided in an axially adjacent block row.

6 Claims, 7 Drawing Sheets

STUDLESS TIRE

BACKGROUND OF THE INVENTION

The present invention relates to a studless tire having a plurality of block rows in the tread portion, and more particularly to a studless tire capable of suppressing a vehicle from staggering at the time of braking on an icy road and a snow-covered road to stabilize the posture of the vehicle.

Various studless tires suitable for traveling on icy and snow-covered roads have been proposed, for example, in JP-A-9-323511 and JP-A-2006-76556. A plurality of blocks provided with a large number of sipes are formed in the tread portion of studless tires. The coefficient of friction between the blocks and an icy road is enhanced by the edges of sipes. The sipes also serve to absorb a thin water film on an icy road into the gaps of the sipes. By a synergistic action of them, studless tires can exhibit both sufficient driving force and braking force on an icy road.

However, even studless tires have a problem that a vehicle is easy to stagger or sideslip on icy and snow-covered roads at the time of driving or braking. For example, a vehicle tends to sideslip when tires are locked during straight running on an icy or snow-covered road.

Accordingly, it is an object of the present invention to provide a winter tire called studless tire which can suppress a vehicle from staggering or sideslipping at the time of braking on icy and snow-covered roads.

This and other objects of the present invention will become apparent from the description hereinafter.

SUMMARY OF THE INVENTION

It has been found that a main cause of staggering or sideslipping on icy and snow-covered roads is that the inclination of lateral grooves provided in the tread portion is oriented to one direction with respect to the axial direction, and that the above-mentioned object can be achieved when rows of blocks are provided in a crown region and shoulder regions of the tread portion of a tire, respectively, and lateral grooves provided in a block row are inclined in the opposite direction to lateral grooves provided in another block row adjacent in an axial direction.

In accordance with the present invention, there is provided a studless tire including a tread portion provided with at least six rows of blocks which are defined by circumferential grooves extending continuously in the circumferential direction of tire and lateral grooves extending in a direction intersecting said circumferential grooves and which are arranged in the circumferential direction in each block row, wherein:

each block is provided with sipes having a depth of at least 3.0 mm, said rows of blocks comprises at least two crown block rows disposed in a crown region extending from the tire equator as the center thereof to have a width of 50% of the tread width, and at least two shoulder block rows disposed on each axially outer side of said at least two crown block rows, and lateral grooves provided in a block row are inclined in the opposite direction, with respect to the axial direction, to lateral grooves provided in another block row adjacent in an axial direction.

In each block row, each of blocks may be provided at intervals with a plurality of incisions having a width of 0.1 to 2.0 mm and a depth of 0.1 to 2.0 mm and extending in the opposite direction to the inclination of the lateral grooves therein with respect to the axial direction.

In an embodiment of the present invention, the sipes in each block row are inclined in the same direction as the lateral grooves disposed in that row with respect to the tire axial direction.

In an embodiment of the present invention, the crown region is provided with three crown block rows comprising a center row extending on the tire equator and two side rows disposed on the both sides of the center row, and the inclination angle θ1 of the lateral grooves disposed in the center row with respect to the axial direction is smaller than the inclination angle θ2 of the lateral grooves disposed in the side rows with respect to the axial direction.

In an embodiment of the present invention, at least two shoulder block rows disposed in each shoulder region include an inner shoulder block row disposed on the tire equator side, and an outer shoulder block row disposed on the ground contact edge side (axially outermost side), and the inclination angle θ3 of the lateral grooves disposed in the inner shoulder block row with respect to the axial direction is larger than the inclination angle θ4 of the lateral grooves disposed in the outer shoulder block row with respect to the axial direction.

The studless tire of the present invention is provided with at least six rows of blocks in the tread portion. Since the blocks in the respective block rows are provided with sipes having a depth of at least 3.0 mm, the tire exhibits an enhanced braking performance on an icy road by edge effect of the sipes. Further, since lateral grooves disposed in a block row and lateral grooves disposed in an axially adjacent block row are inclined in the reverse directions to each other with respect to the axial direction, an automobile is effectively prevented from staggering or sideslipping at the time of braking on icy and snow-covered roads. Furthermore, since at least two block rows are provided in the crown region where the ground contact pressure will become high on an icy road while at least four block rows are provided in the shoulder regions where the ground contact pressure will become high on a snow-covered road, the staggering or sideslipping at the time of braking can be suppressed on both an icy road and a snow-covered road in a good balance.

BRIEF DESCRIPTION OF THE DRAWINGS

FIG. 7b is a schematic cross section view showing a braking state of a block in FIG. 7a.

DETAILED DESCRIPTION OF THE INVENTION

An embodiment of the present invention will now be explained with reference to the accompanying drawings.

Figure 1:
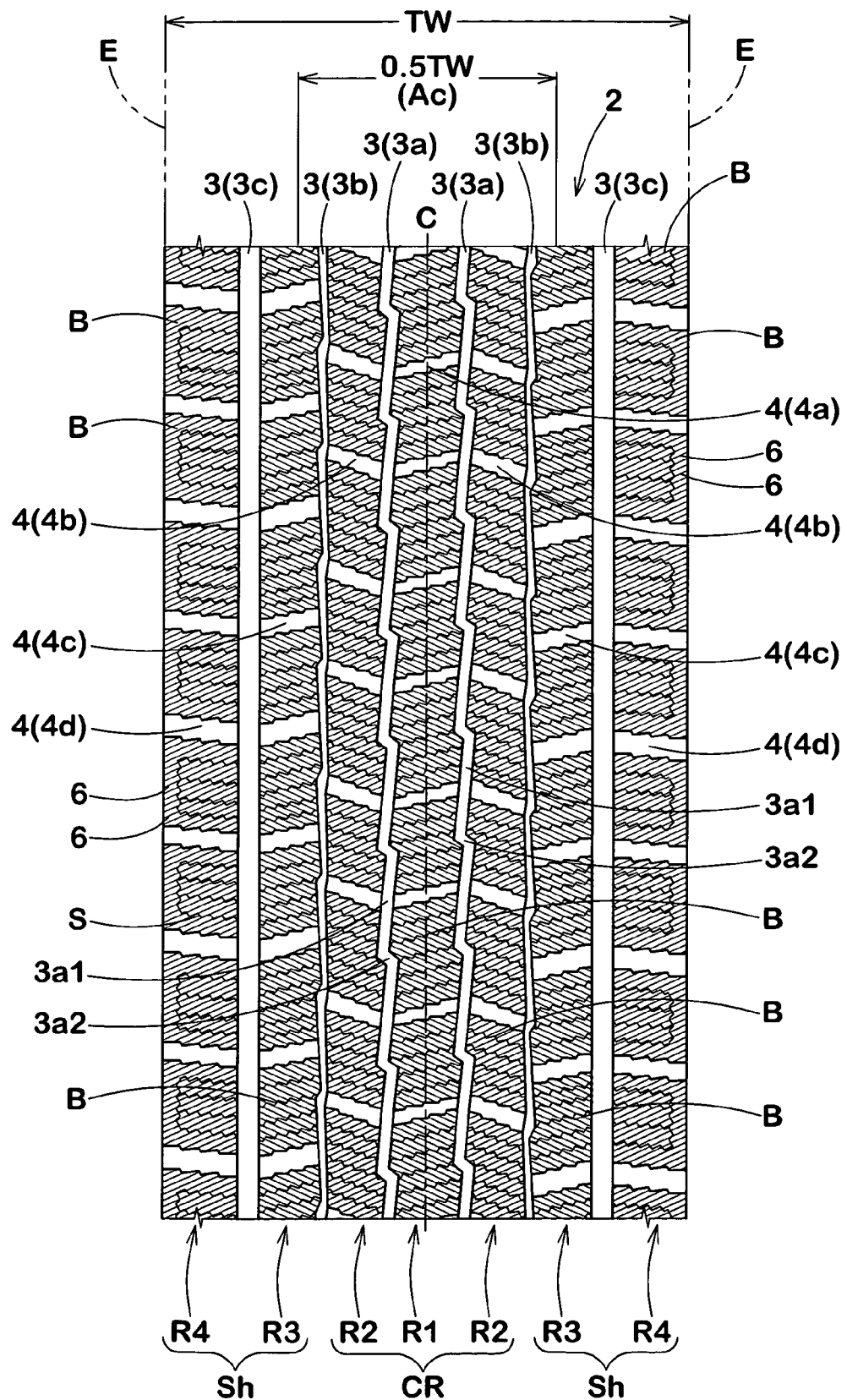
FIG. 1 is a development of a tread pattern illustrating an embodiment of the present invention.
Figure 2:
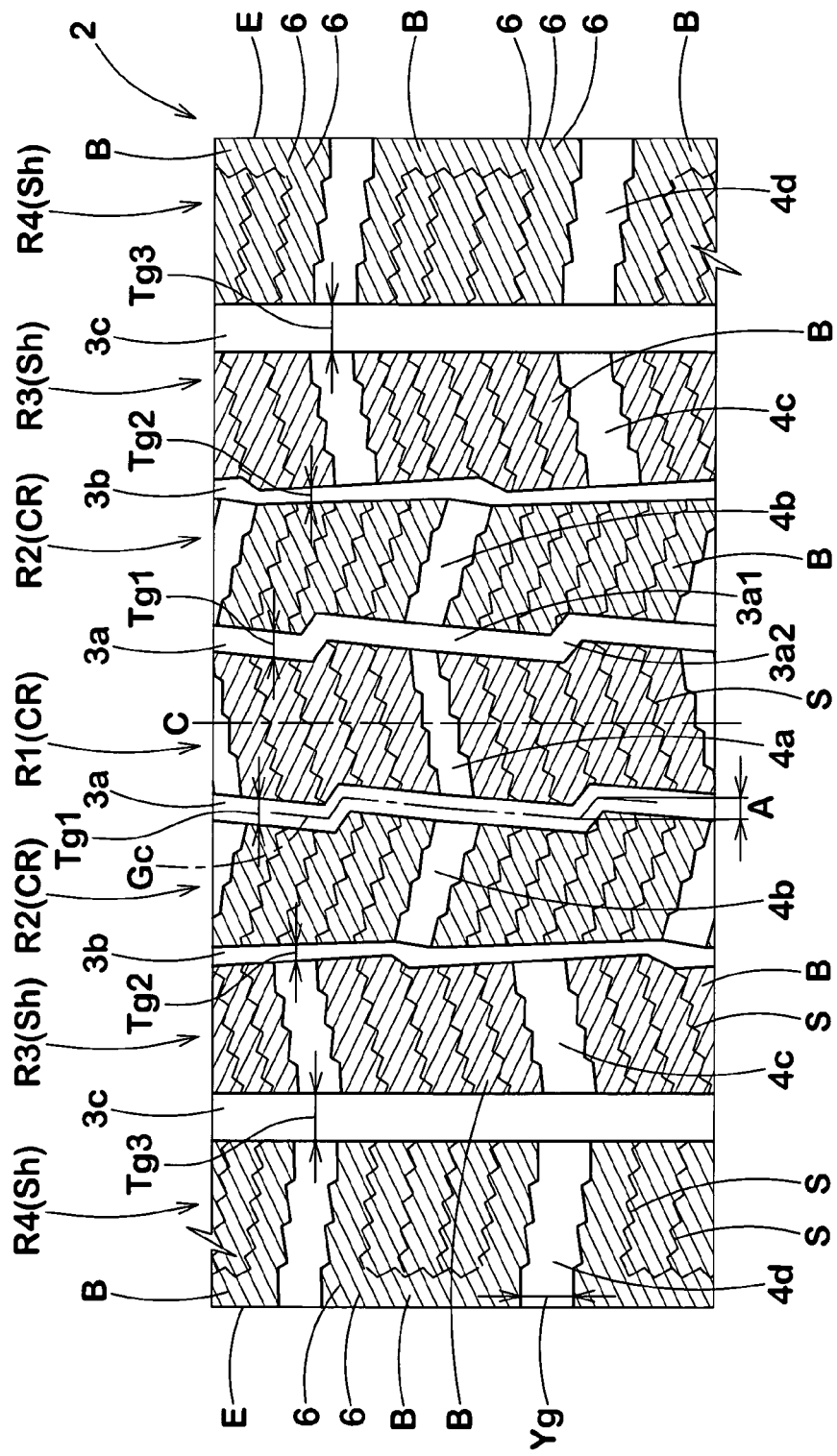
FIG. 2 is an enlarged view of a part of FIG. 1.

FIG. 1 is a development of a tread portion 2 of a studless tire (the entire of which is not shown) illustrating an embodiment of the present invention, and FIG. 2 is a partial enlarged view thereof.

The tread portion 2 is provided with at least six rows of blocks B arranged in the circumferential direction. In this embodiment shown in the drawings are provided seven block rows R1 to R4.

The block rows comprise at least two crown block rows CR disposed in a crown region Ac extending from the tire equator C as the center thereof to have a width of 50% of tread width TW (i.e., width of 0.5 TW), and at least two shoulder block rows Sh disposed on each axially outer side of the crown block rows CR, in other words, at least four shoulder block rows Sh in total disposed in the shoulder regions.

Herein, the "block rows disposed in a crown region Ac" means rows of blocks that the center of gravities of all blocks B are located in the crown region Ac.

The crown block rows CR in this embodiment are composed of three block rows, specifically a center crown block row R1 extending on the tire equator C and a pair of side crown block rows R2, R2 disposed on the both sides of the center row R1.

In this embodiment shown in the drawings, the shoulder block rows Sh disposed in each shoulder region are composed of two block rows, especially an inner shoulder block row R3 disposed on the tire equator C side, and an outer shoulder block row R4 disposed on the ground contact edge E side (axially outermost side).

Between the ground contact edges E, E of the tread portion 2, the blocks B are defined by a plurality of circumferential grooves 3 extending continuously in the circumferential direction of tire and a plurality of lateral grooves 4 extending in a direction intersecting the circumferential grooves 3.

The circumferential grooves 3 provided in this embodiment are six in total. Specifically, the circumferential grooves 3 comprises a pair of inner circumferential grooves 3a, 3a which are disposed in the vicinity of the tire equator C and extend on the both sides of the tire equator C, a pair of outer circumferential grooves 3c, 3c which are disposed axially outward of the inner grooves 3a, 3a and extend circumferentially on a side closest to the ground contact edges E, E, and a pair of middle circumferential grooves 3b, 3b extending between the outer circumferential groove 3c and the inner circumferential groove 3a. These circumferential grooves 3a to 3c are disposed at locations which are substantially line-symmetric with respect to the tire equator C.

The inner and middle circumferential grooves 3a and 3b may be formed, for example, into a zigzag form extending in the circumferential direction. Such zigzag grooves are preferred in that a grip on an icy road, especially a grip in cornering, is enhanced since zigzag grooves have a longer groove edge than a straight groove. It is desirable that the amplitude of a zigzag of the circumferential grooves 3 is as small as possible in order to prevent the rigidity of blocks in the circumferential direction from markedly lowering. For example, as shown in FIG. 2, at a groove center line Gc of the zigzag circumferential groove 3a or 3b, the amplitude A from peak to peak in the axial direction is preferably at most 4%, more preferably at most 2%, of the tread ground contact width TW.

The term "tread ground contact width TW" as used herein means an axial distance between the ground contact edges E, E of the tread portion 2 of a tire that contacts a flat surface when the tire is mounted on a standard rim and inflated to a normal inner pressure and the tire in such a standard state is then loaded with a normal load. By the way, the dimensions of respective parts or portions of a tire denote values measured in the standard state, unless otherwise noted.

The term "standard rim" denotes a rim defined for every tire in a standardizing system on which the tire is based and is, for example, "standard rim" in JATMA, "Design Rim" in TRA and "Measuring Rim" in ETRTO.

The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO", provided that in case of tires for passenger cars, the "normal inner pressure" is 180 kPa.

The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO, provided that in case of tires for passenger cars, the "normal load" is a load of 88% of the load defined above.

On the other hand, the outer circumferential grooves 3c are formed into a straight line form which linearly extends in the circumferential direction. Such linear circumferential grooves 3c disposed on the ground contact edge E side are preferred in that a cornering performance on a snow-covered road is enhanced.

The shape of the respective circumferential grooves 3 is not limited to specific shapes as exemplified above, but various shapes such as wave and other zigzag shapes than that shown in the drawings are applicable to the circumferential grooves 3 in the present invention.

From the viewpoint of exhibiting a sufficient cornering performance on a snow-covered road, it is preferable that each of groove widths Tg1 to Tg3 of the circumferential grooves 3 measured in the axial direction is at least 2 mm, especially at least 3 mm. On the other hand, from the viewpoint of sufficiently securing the pattern rigidity of the tread portion 2 to enhance the abrasion resistance, it is preferable that each of groove widths Tg1 to Tg3 of the circumferential grooves 3 is at most 9 mm, especially at most 8 mm. From the same viewpoints, it is preferable that the depth of circumferential grooves is at least 8 mm, especially at least 9 mm, and is at most 12 mm, especially at most 11 mm.

The width Tg1 of the inner circumferential groove 3a, the width Tg2 of the middle circumferential groove 3b and the width Tg3 of the outer circumferential groove 3c may be the same or different. For example, the ground contact pressure in the crown region Ac of the tread portion 2 is apt to become high relatively when running on an icy road and, therefore, it is effective for obtaining a high grip on an icy road to increase the ground contact area in this portion. Thus, it is preferable that the groove width Tg1 of the inner circumferential grooves 3a or the groove width Tg2 of the middle circumferential grooves 3b is smaller than the groove width Tg3 of the outer circumferential grooves 3c. Making the groove width Tg3 large relatively is also preferable in that snow bites into the outer circumferential grooves 3c, and it is pressed into a large snow column in the grooves and is sheared to exhibit a large lateral force when cornering on a snow-covered road.

The lateral grooves 4 include center crown lateral grooves 4a extending across between the inner circumferential grooves 3a, 3a, side crown lateral grooves 4b extending across between the inner circumferential groove 3a and the middle circumferential groove 3b, inner shoulder lateral grooves 4c extending across between the middle circumferential groove 3b and the outer circumferential groove 3c, and outer shoulder lateral grooves 4d extending across between the outer circumferential groove 3c and the ground contact edge E.

The lateral grooves 4a to 4d in this embodiment have groove walls formed into a zigzag form. The zigzag groove wall is helpful in enhancing a grip on an icy road since the length of the edges of lateral grooves 4a to 4d are increased.

From the viewpoint of exhibiting a high shearing force for a snow column on a snow-covered road, the groove width Yg of lateral grooves 4 measured in the circumferential direction is preferably at least 5 mm, more preferably at least 6 mm, though the groove width Yg is not particularly limited thereto. On the other hand, from the viewpoint of preventing the area of land portions from lowering to thereby enhance a grip on an icy road, the groove width Yg is preferably at most 9 mm, more preferably at most 8 mm. Further, the depth of the lateral grooves 4 is not particularly limited, but is preferably from 90 to 100% of the depth of the circumferential grooves 3.

Lateral grooves 4 provided in a block row of the block rows R1 to R4 are inclined in the reverse direction, with respect to the axial direction, to lateral grooves 4 provided in an axially adjacent block row. In the embodiment shown in the drawings, the center crown lateral grooves 4a provided in the center crown block row R1 and the inner shoulder lateral grooves 4c provided in the inner shoulder block rows R3, R3 are inclined diagonally right up with respect to the axial direction. On the other hand, the side crown lateral grooves 4b provided in the side crown block row R2, R2 and the outer shoulder lateral grooves 4d provided in the outer shoulder block rows R4, R4 are inclined diagonally right down with respect to the axial direction.

Figure 7A:
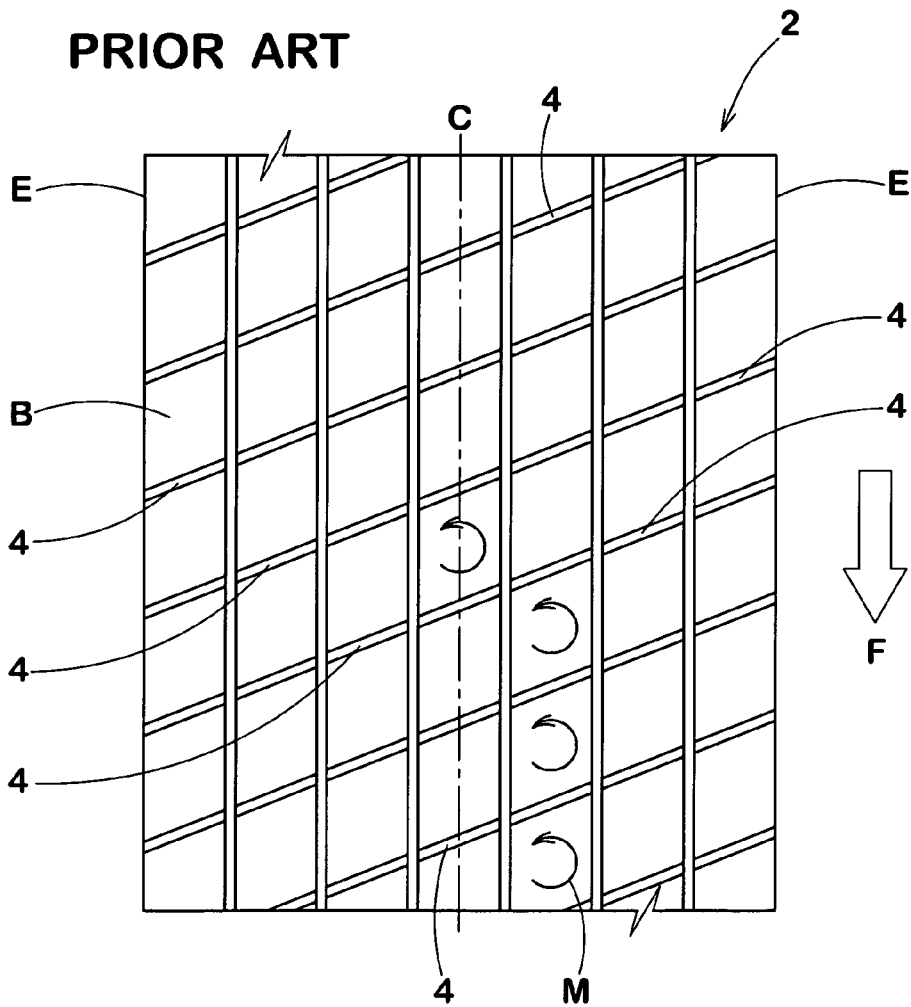
FIG. 7a is a plan view of a conventional tread pattern.
Figure 7B:
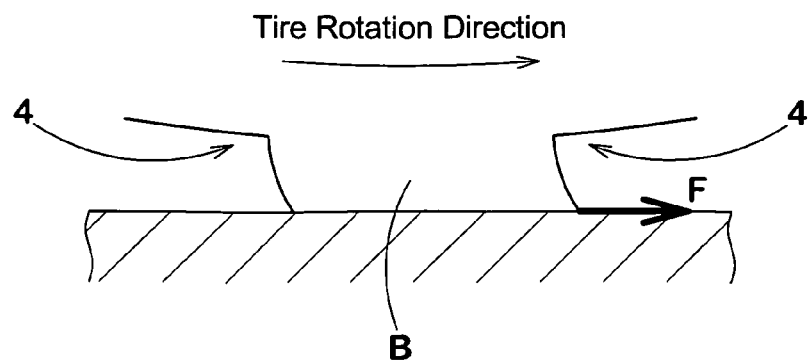

For example, in the case that all lateral grooves 4 are disposed diagonally right up with respect to the axial direction, as shown in FIG. 7a and as seen in conventional tires, approximately parallelogram blocks B are formed in the tread portion 2. If a braking force F acts on such blocks B in the direction shown in FIGS. 7a and 7b, a load decentered toward the ground contact edge on the first-ground-contacting side acts on blocks B in ground contacting surface, so moments to rotate the blocks B in an arrow direction M work on the blocks B. Thus, it is conceived that such moments acting on the blocks in the same direction cause a vehicle to stagger or sideslip on a slippery road.

In contrast, in the studless tire 1 of the present invention, the inclination direction of lateral grooves 4 with respect to the axial direction is alternately changed between adjacent block rows so that the lateral grooves 4 do not orient to one direction with respect to the axial direction. Therefore, even if moments M as mentioned above generate in respective blocks B, they are offset each other to prevent a vehicle from staggering or sideslipping at the time of braking.

Further, in the studless tire 1 of the present invention, at least two block rows R1 and R2 are provided in the crown region Ac where the ground contact pressure will become high on an icy road, while at least two block rows R3 and R4 are provided in each of the shoulder regions where the ground contact pressure will become high on a snow-covered road. Like this, block rows are provided all over the tread portion 2 and, therefore, staggering at the time of braking is suppressed on both an icy road and a snow-covered road. An edge effect brought by both lateral grooves 4 and sipes S provided in the blocks B is exhibited in straight running and cornering, so a high grip is obtained.

The inclination angles θ of the respective lateral grooves 4 with respect to the axial direction are not particularly limited. However, if the angle θ is too large, an edge component in the axial direction of the lateral grooves 4 is decreased, so a sufficient driving force is not obtained on an icy road. Further, the rigidity in the circumferential direction of the blocks B is easy to lower, so uneven wear is easy to occur in an early stage of use. From such points of view, the angle θ of the lateral grooves 4 with respect to the axial direction is preferably at most 30°, more preferably at most 25°. On the other hand, if the angle θ of the lateral grooves 4 is too small, an edge component in the circumferential direction of the lateral grooves 4 is decreased, so the cornering performance on an icy road is not sufficiently enhanced. From such a point of view, the angle θ of the lateral grooves 4 with respect to the axial direction is preferably at least 3°, more preferably at least 5°.

Figure 3:
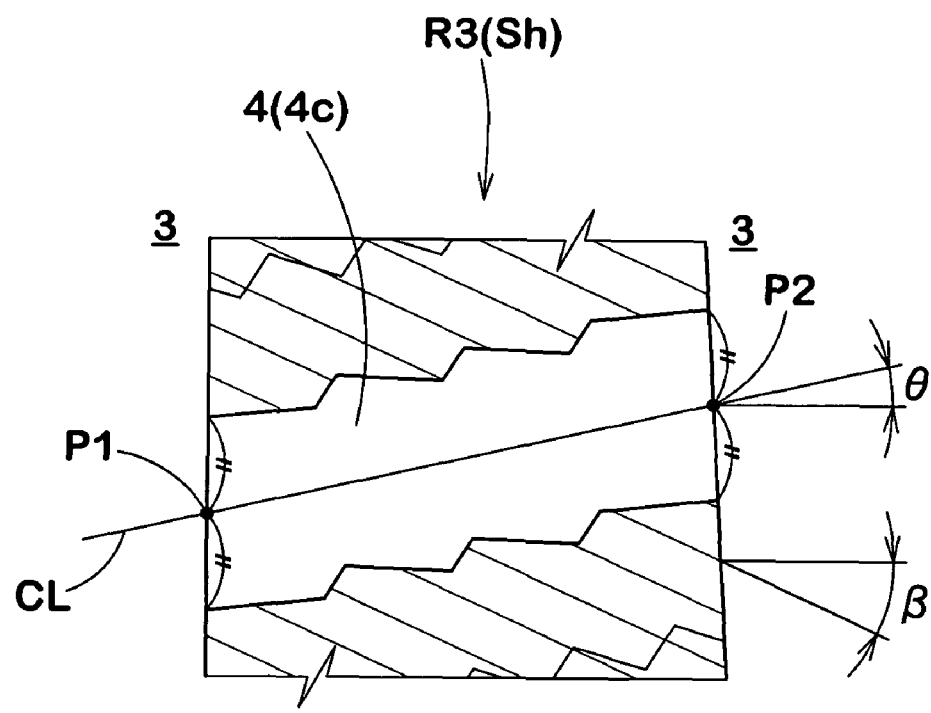
FIG. 3 is a partial enlarged view of a lateral groove as shown in FIG. 1.

Here, the "angle θ of the lateral grooves 4 with respect to the axial direction" denotes, as shown in FIG. 3 in an enlarged form, an angle of a straight line CL connecting middle points P1 and P2 of both axial ends of a lateral groove 4 (end portions which open to the circumferential grooves 3 or which open to the circumferential groove 3 and the tread ground contact edge E) with respect to the axial direction of tire.

Figure 4:
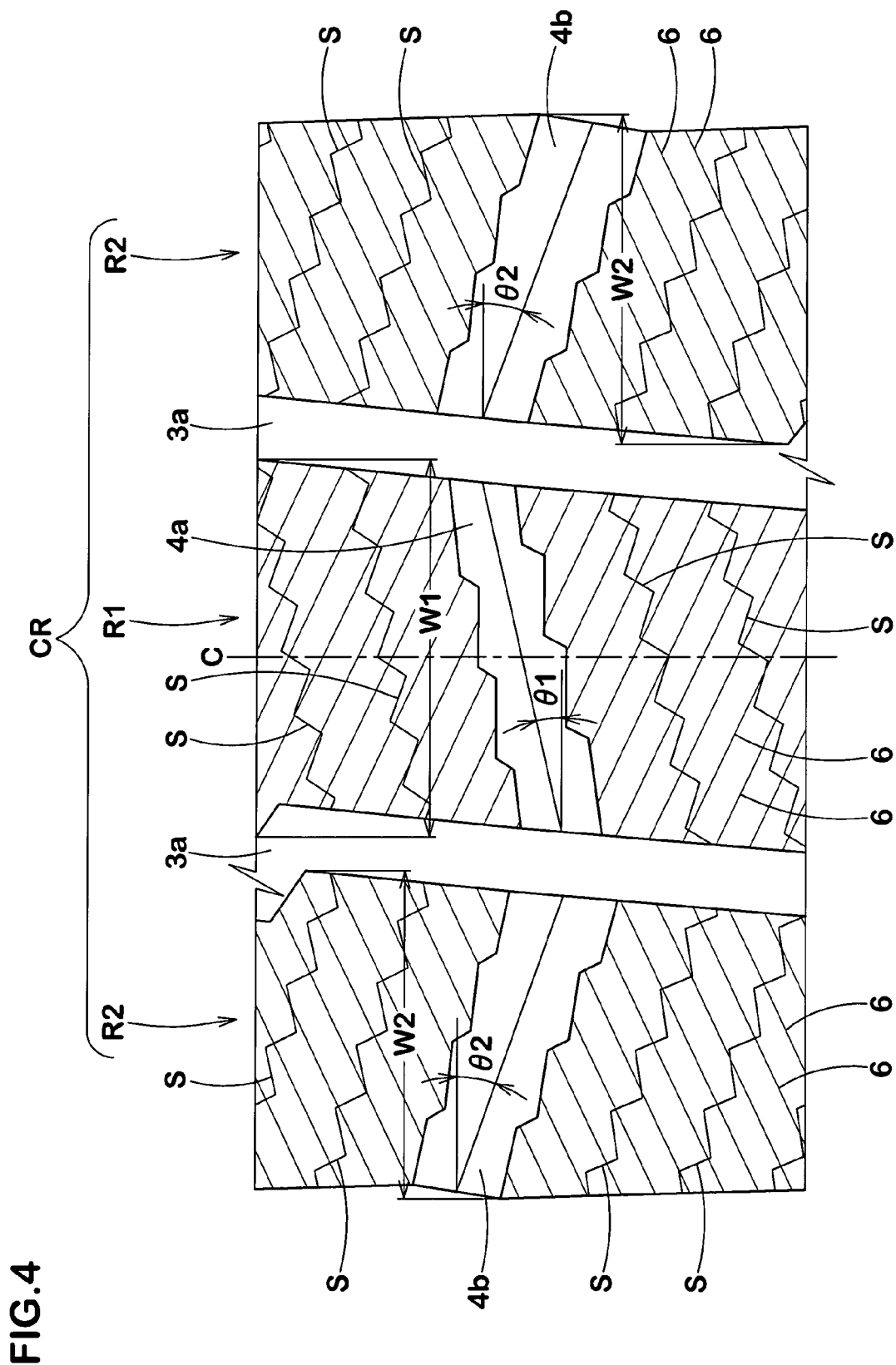
FIG. 4 is a partial enlarged view of crown block rows as shown in FIG. 1.

As shown in FIG. 4 in an enlarged form, in the studless tire of the present invention, the angle θ1 of center crown lateral grooves 4a disposed in the center crown block row R1 with respect to the axial direction is smaller than the angle θ2 with respect to the axial direction of side crown lateral grooves 4b disposed in the side crown block rows R2 located on the both sides of the center row R1.

Since a large ground contact pressure acts on the center crown block row R1 as compared with the side crown block rows R2, influence of inclination of lateral grooves 4 is apt to strongly appear as staggering or sideslipping of vehicles in braking. The influence of inclination of the lateral grooves 4a and 4b can be decreased as a whole of the crown region Ac by making the angle θ1 of the center crown lateral grooves 4a smaller than the angle θ2 of the side crown lateral grooves 4b. In order to exhibit such an action surely, it is preferable that the ratio (θ2/θ1) of the angle θ2 of the side crown lateral grooves 4b to the angle θ1 of the center crown lateral grooves 4a is at least 1.2, especially at least 1.5. On the other hand, if the θ2/θ1 ratio is too large, uneven wear is easy to occur. Therefore, the θ2/θ1 ratio is preferably at most 2.5.

Figure 5:
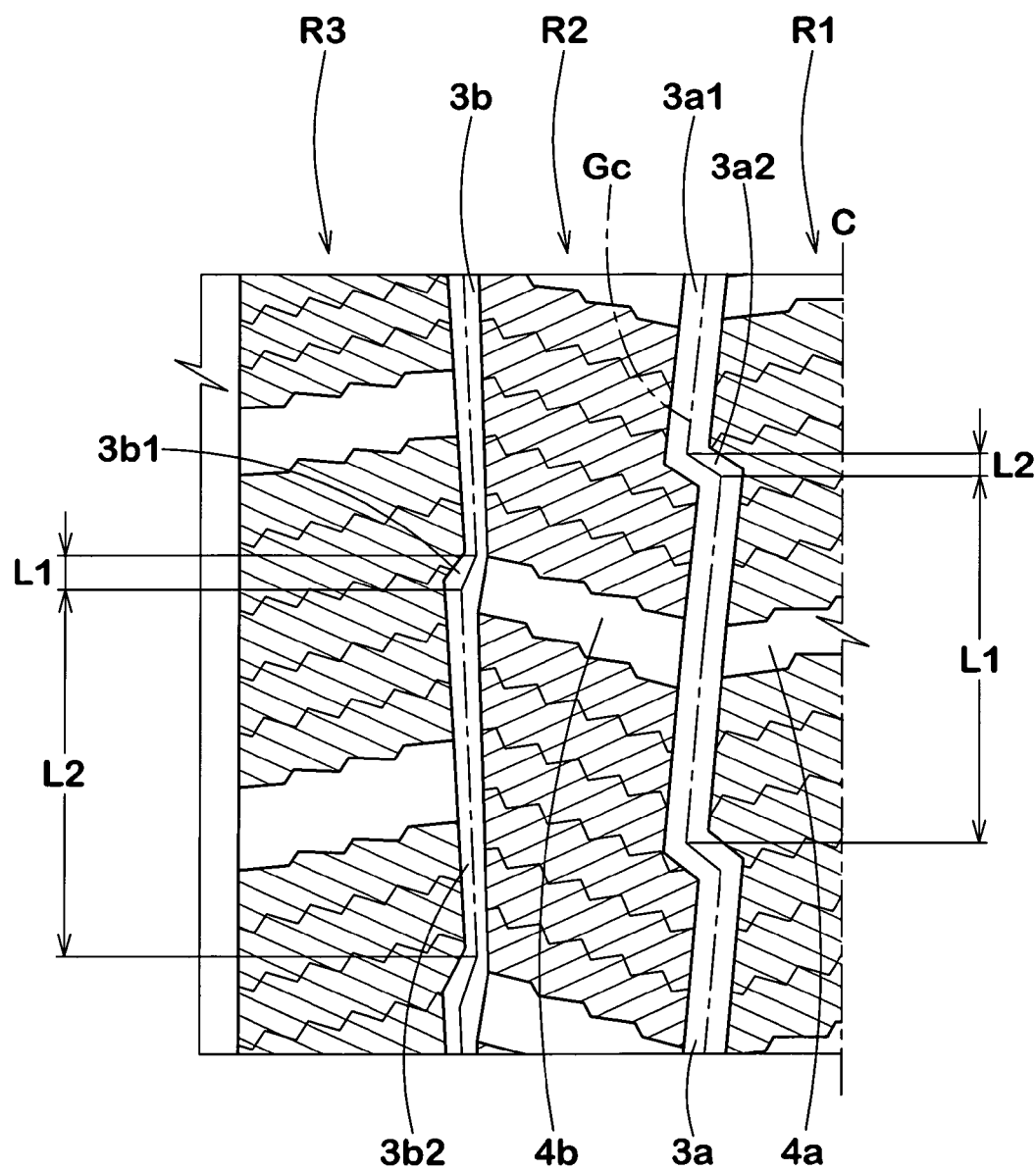
FIG. 5 is a partial enlarged view of the tread pattern.

As shown in FIG. 5, inner circumferential grooves 3a in this embodiment are formed in a zigzag shape such that it comprises upward-sloping components 3a1 (components extending diagonally right up) and downward-sloping components 3a2 (components extending diagonally right down) when viewed from above, and these components 3a1 and 3a2 are disposed alternately. The circumferential length L1 of the upward-sloping components 3a1 is longer than the circumferential length L2 of the downward-sloping components 3a2.

As stated above, if the amplitude A of a zigzag of the circumferential grooves is made small, the corner angle of the zigzag (bending angle at corners) approaches 180° when the zigzag is a simple zigzag shape and, therefore, sufficient edge action and effect of pressing snow into a column are not obtained. However, when the lengths of the inclining components of a zigzag are differentiated from each other as in the embodiment shown in the drawings, corner portions of the zigzag can be formed at a relatively small angle. This is helpful, for example, in obtaining a high grip on a snow-covered road since snow is effectively pressed into a column and is sheared by the downward-sloping components 3a2.

On the other hand, in such inner circumferential grooves 3a, the proportion of the upward-sloping component is high. This has a possibility of exerting a bad influence on staggering of a vehicle in braking. Thus, in this embodiment, the middle circumferential grooves 3b are formed into a zigzag form such that downward-sloping components 3b2 have a larger length L2 than the length L1 of upward-sloping components 3b1. Like this, the directional bias of the inner circumferential grooves 3a is balanced by increasing the proportion of the downward-sloping components 3b2 of the middle circumferential grooves 3b. Thus, with respect to the circumferential grooves 3, too, since a directional bias can be diminished, staggering of a vehicle in braking can be more surely suppressed.

Further, in this embodiment, the directions of the lateral grooves 4a and 4b in the crown region Ac with respect to the axial direction are determined in association with the above-mentioned constitution of the circumferential grooves 3a and 3b. That is to say, since the inner circumferential grooves 3a have a larger proportion of the upward-sloping components than the downward-sloping components, the side crown lateral grooves 4b disposed in the side crown block rows R2 are formed to extend diagonally right down to thereby balance the directional bias of the inner circumferential grooves 3a. Staggering of a vehicle in braking can be further surely suppressed thereby.

In order to suppress the staggering in braking, it is particularly preferable that the maximum width W1 in the axial direction of the center crown block row R1 at which the ground contact pressure is high, is made larger than the maximum width W2 in the axial direction of the side crown block row R2, as shown in FIG. 4.

Figure 6:
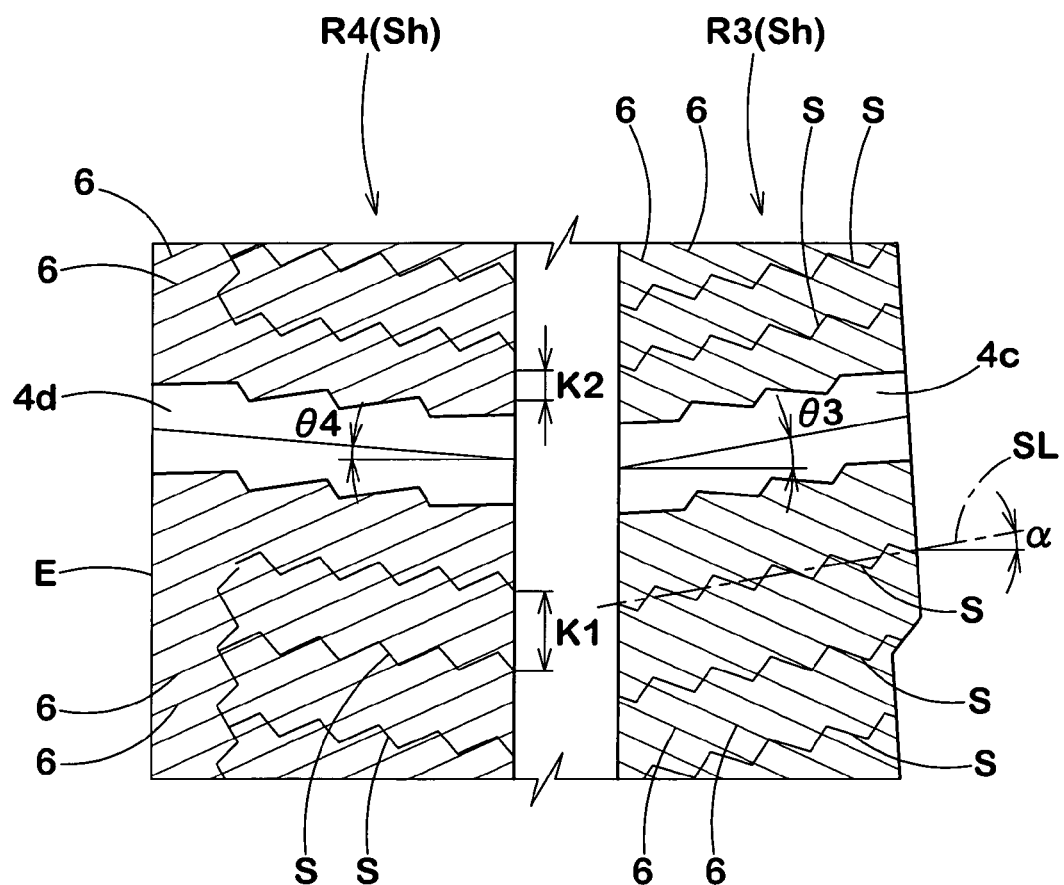
FIG. 6 is a partial enlarged view of shoulder block rows as shown in FIG. 1.

As shown in FIG. 6, the inner shoulder lateral grooves 4c disposed in the inner shoulder block row R3 are formed to have a larger inclination angle θ3 with respect to the axial direction than the inclination angle θ4 with respect to the axial direction of the lateral grooves 4d disposed in the outer shoulder block row R4, whereby the rigidity of blocks included in the outer shoulder block row R4 on which a large ground contact pressure acts at the time of cornering, can be enhanced as compared with that in the inner shoulder block row R3. Thus, staggering of a vehicle in cornering and uneven wear can be effectively prevented.

Further, in the present invention, a plurality of sipes S are provided in each of blocks B. The sipes S are formed as slit-like incisions having such a narrow width that both walls come into contact at the time of running. It is preferable that the width of sipes S is from about 0.3 to about 1.0 mm. The depth of the sipes S is at least 3.0 mm, preferably at least 5 mm. If the depth of sipes S is less than 3.0 mm, the edge effect on an icy road is not sufficiently obtained. If the depth of sipes S is too large, there is a possibility that the rigidity of blocks B is excessively lowered. Therefore, the depth is preferably not more than 100%, more preferably not more than 80%, of the maximum depth of lateral grooves 4.

The sipes S may be formed in various forms such as straight line, wave, zigzag and combinations thereof. Zigzag sipes as shown in the drawings are particularly preferred. Such sipes S exhibit a high grip performance on an icy road since the edges function in various directions. The sipes S are formed into a semi-open type that at least one end of each sipe opens to a circumferential groove 3 or a tread ground contact edge E, preferably into a full-open type that both ends of each sipe open to circumferential grooves 3.

In the block rows R1 to R4, the sipes S are inclined in the same direction as the inclination of lateral grooves 4 in each block row with respect to the axial direction. Preferably, the inclination angle α of the sipes S with respect to the axial direction is substantially the same as the inclination angle θ of the lateral grooves in each block row. Sipes S provided in each of the block rows R1 to R4 are inclined in the reverse direction, with respect to the axial direction, to sipes S provided in an axially adjacent block row in the same manner as the lateral grooves 4. Therefore, since a directional bias is eased with respect to the sipes, too, staggering or sideslipping of a vehicle during braking can be more effectively suppressed. In the embodiment shown in the drawings, since the sipes S are efficiently disposed in the blocks B, the edge effect can be effectively exhibited and, in addition, the shape of block segments defined by the sipes S is uniformized. This is effective for suppressing uneven wear. Here, the inclination angle α of the sipes S is defined as an angle of a straight line SL connecting the both ends of a sipe S with respect to the axial direction, as shown in FIG. 6.

Further, as shown in FIG. 6, the pitch or interval K1 in the circumferential direction between adjacent two sipes S is substantially constant in each block row. On the other hand, for example, sipes S disposed in the crown block row CR at which the ground contact pressure becomes high on an icy road, may be formed at an interval smaller than the interval of sipes S disposed in the shoulder block rows Sh, whereby performances on an icy road is further enhanced.

The tread portion 2 of the studless tire according to the present invention may be provided with linear incisions inclining in the opposite direction to lateral grooves 4 and sipes S with respect to the axial direction. In the embodiment shown in the drawings, a plurality of incisions 6 are provided at intervals in each block B wherein the incisions 6 extend in the opposite direction to the inclination of the lateral grooves 4 (and the sipes S) in a block row for that block with respect to the axial direction. The incisions 6 have a width of 0.1 to 2.0 mm and a depth of 0.1 to 2.0 mm.

Such incisions 6 are helpful in enhancing a grip on an icy road by the edges thereof as well as sipes S and also in increasing the coefficient of road surface friction by absorption of water on an icy road. Since the incisions 6 are formed to have a smaller depth than the sipes S, they are helpful particularly in enhancing initial performances of a fresh tire in an early stage of use. Further, since the incisions 6 are formed to incline in the reverse direction to the sipes S with respect to the axial direction, they are helpful in preventing a vehicle from staggering during braking on roads in various states.

If the width or depth of incisions 6 is less than 0.1 mm, the above-mentioned actions are not sufficiently exhibited since the incisions are too small. If the width or depth is more than 2.0 mm, there is a possibility that the rigidity of block B is excessively lowered, resulting in occurrence of rubber chipping and uneven wear. If the incisions 6 are formed to incline in the same direction as the sipes S with respect to the axial direction, an directional bias generates in inclination of these sipes and incisions and may be a cause of staggering in braking.

The inclination angle β of incisions 6 with respect to the axial direction is determined so as not to cause a directional bias of inclination. As shown in FIG. 3, in this embodiment, incisions 6 are formed so that the absolute value of the inclination angle β of incisions disposed in a block B is larger than the absolute value of the inclination angle θ of lateral grooves 4 which define said block B on which the incisions are formed (and is larger than the absolute value of the angle α of sipes S disposed in that block B).

In each block B, the incisions 6 are formed in the form of substantially a straight line at intervals in parallel with each other. As shown in FIG. 6, the interval K2 in the circumferential direction of the incisions 6 is smaller than the interval K1 of the sipes S. The interval K2 is preferably at most 50%, more preferably at most 40%, of the interval K1 of the sipes S.

While an embodiment of the present invention has been described with reference to the drawings, it goes without saying that the present invention is not limited to only a tread pattern as mentioned above, and variously modified tread patterns are applicable.

The present invention is more specifically described and explained by means of the following examples. It is to be understood that the present invention is not limited to these examples.

EXAMPLES

Studless tires for passenger cars (size: 195/65R15) having a tread pattern shown in FIG. 1 were manufactured based on specifications shown in Table 1 and as described below. Specifications of respective portions common to all tires are as follows:
Tread width TW: 168 mm
Groove width Tg1 of inner circumferential groove: 4.0 to 5.5 mm
L1/L2 ratio of upward-sloping component to downward-sloping component of inner circumferential groove: 16/1
Groove depth Tg2 of middle circumferential groove: 1.8 to 4.2 mm
L1/L2 ratio of upward-sloping component to downward-sloping component of middle circumferential groove: 1/8
Groove width Tg3 of outer circumferential groove: 7.0 mm
Groove width of center crown lateral groove: 4.5 to 5.0 mm
Groove width of side crown lateral groove: 5.5 to 6.0 mm
Groove width of inner shoulder lateral groove: 6.0 to 7.2 mm
Groove width of outer shoulder lateral groove: 6.0 to 7.2 mm
Depth of respective circumferential grooves: 9.9 mm
Depth of respective lateral grooves: 9.9 mm
Width of sipes: 0.3 mm
Depth of sipes: 8.0 mm
Inclination angle o sipes: same as the angle (or its absolute value) of lateral grooves
Interval K1 of sipes: 5.0 mm
Width of incisions: 0.5 mm
Depth of incisions: 0.5 mm
Interval K2 of incisions: 2.0 mm The studless tires were tested by the following methods.

<Staggering in Braking>

The tires were attached to a Japanese 2,000 cc four-wheel-drive car. The car was run at a temperature of 0° on both an icy road and a trodden snow road at a speed of 15 km/hour, and a full lock sudden braking was applied. The degree of staggering of the car at the time of braking was evaluated by a driver's feeling. The evaluation was made by a relative evaluation based on Example 1 regarded as a rating of 100. The larger the value, the less the staggering and accordingly the better the stability.

<Running Performances on Icy and Snow-Covered Roads>

The test car mentioned above was run on an icy road or a snow-covered road in each test course, and performances such as steering wheel responsibility, cornering stability and feeling of grip were evaluated by a professional test driver's feeling. The results are shown by an index based on Example 1 being 100. The lager the value, the better.

<Wear Resistance>

The test car mentioned above was run 3,000 km on a dry asphalt road. With respect to each of block rows, the amount of wear (average value) of the both circumferential edge portions of a block and the amount of wear of a center portion of the block were measured, and the difference between them was obtained. The measurement was made with respect to three blocks on the tire circumference for each block row, and the average value was obtained. The results are shown by an index of the reciprocal of the obtained average value based on Example 1 being 100. The larger the value, the better the wear resistance.

The results are shown in Table 1.

It is observed in the table that the tires of the Examples according to the present invention have a noticeably improved performance in staggering of vehicle during braking on icy and snow-covered roads. It is also observed that the running performances on icy and snow-covered roads are improved, and the wear resistance is comparable to that of tires having a known tread pattern.

TABLE 1

|  | Ex. 1 | Ex. 2 | Ex. 3 | Ex. 4 | Ex. 5 | Ex. 6 |
| --- | --- | --- | --- | --- | --- | --- |
| Inclination of center crown lateral grooves | Diagonally right up | " | " | " | " | " |
| Angle θ1 of center crown lateral grooves (degree) | 12 | 12 | 20 | 12 | 12 | 12 |
| Inclination of side crown lateral grooves | Diagonally right down | " | " | " | " | " |
| Angle θ2 of side crown lateral grooves (degree) | 20 | 20 | 20 | 35 | 20 | 20 |
| Inclination of inner shoulder lateral grooves | Diagonally right up | " | " | " | " | " |
| Angle θ3 of inner shoulder lateral grooves (degree) | 10 | 10 | 10 | 10 | 10 | 20 |
| Inclination of outer shoulder lateral grooves | Diagonally right down | " | " | " | " | " |
| Angle θ4 of outer shoulder lateral grooves (degree) | 5 | 5 | 5 | 5 | 10 | 5 |
| Inclination directions of sipes and lateral grooves | same | same | same | same | same | same |
| Inclination directions of sipes and incisions | same | reverse | reverse | reverse | reverse | reverse |
| Angle β of incisions (degree) | 25 | 25 | 25 | 25 | 25 | 25 |
| Staggering in braking on icy road (index) | 100 | 105 | 90 | 95 | 100 | 100 |
| Staggering in braking on snow-covered road (index) | 100 | 105 | 90 | 95 | 100 | 100 |
| Running performances on icy road (index) | 100 | 105 | 100 | 100 | 90 | 100 |
| Running performances on snow-covered road (index) | 100 | 105 | 100 | 100 | 90 | 100 |
| Wear resistance (index) | 100 | 100 | 95 | 85 | 85 | 80 |

|  | Com. Ex. 1 | Com. Ex. 2 | Com. Ex. 3 |
| --- | --- | --- | --- |
| Inclination of center crown lateral grooves | Diagonally right up | Diagonally right up | Diagonally right up |
| Angle θ1 of center crown lateral grooves (degree) | 12 | 12 | 12 |
| Inclination of side crown lateral grooves | Diagonally right up | Diagonally right up | Diagonally right down |

TABLE 1-continued

| | | | |
|---|---|---|---|
| Angle θ2 of side crown lateral grooves (degree) | 12 | 12 | 12 |
| Inclination of inner shoulder lateral grooves | Diagonally right up | Diagonally right up | Diagonally right up |
| Angle θ3 of inner shoulder lateral grooves (degree) | 12 | 12 | 12 |
| Inclination of outer shoulder lateral grooves | Diagonally right up | Diagonally right down | Diagonally right up |
| Angle θ4 of outer shoulder lateral grooves (degree) | 12 | 12 | 12 |
| Inclination directions of sipes and lateral grooves | same | same | same |
| Inclination directions of sipes and incisions | reverse | reverse | reverse |
| Angle β of incisions (degree) | 25 | 25 | 25 |
| Staggering in braking on icy road (index) | 85 | 85 | 95 |
| Staggering in braking on snow-covered road (index) | 85 | 95 | 85 |
| Running performances on icy road (index) | 100 | 100 | 100 |
| Running performances on snow-covered road (index) | 100 | 100 | 100 |
| Wear resistance (index) | 85 | 85 | 85 |

Note:
Angle of sipes is the same as angle (or its absolute value) of lateral grooves.

What is claimed is:

1. A studless tire including a tread portion provided with at least six rows of blocks which are defined by circumferential grooves extending continuously in the circumferential direction of tire and lateral grooves arranged in the circumferential direction in each of said at least six rows, wherein:
    each said block is provided with zigzag sipes having a depth of at least 3.0 mm,
    said at least six rows of the blocks comprises
    at least two crown block rows disposed within a crown region centered on the tire equator and having a width of 50% of the tread width, and
    at least two shoulder block rows disposed on each of the axially outer sides of said at least two crown block rows, and
    the lateral grooves in each of said at least six rows are inclined in one direction, with respect to the axial direction, oppositely to the lateral grooves in the axially adjacent row or rows of said at least six rows, and
    in each of said at least six rows, the blocks therein are provided with a plurality of incisions which extend in one direction opposite to the inclining direction of the lateral grooves therein with respect to the axial direction, and the incisions have a width of 0.1 to 2.0 mm and a depth of 0.1 to 2.0 mm, wherein
    said circumferential grooves are an axially inner circumferential groove, a middle circumferential groove and an axially outer circumferential groove disposed on each side of the tire equator,
    the axially outer circumferential grooves are straight grooves,
    the inner and middle circumferential grooves are zigzag grooves each made up of alternately arranged short segments and long segments,
    said at least two crown block rows are three crown block rows comprising a center row disposed on the tire equator and two side rows disposed one on each side of the center row,
    the inclination angle θ1 of the lateral grooves disposed in the center row with respect to the axial direction is smaller than the inclination angle θ2 of the lateral grooves disposed in the side rows with respect to the axial direction,
    said at least two shoulder block rows include an inner shoulder block row disposed on the tire equator side and an outer shoulder block row disposed on the ground contact edge side, and
    the inclination angle θ3 of the lateral grooves disposed in the inner shoulder block row with respect to the axial direction is larger than the inclination angle θ4 of the lateral grooves disposed in the outer shoulder block row with respect to the axial direction.

2. The studless tire of claim 1, wherein
    in each of said a least six rows, the zigzag sipes therein are inclined in the same direction as the lateral grooves therein.

3. The studless tire of claim 1, wherein
    each said lateral groove has zigzag groove walls.

4. The studless tire of claim 1, wherein
    the inclination angles of said lateral grooves are at least 3 degrees and at most 30 degrees with respect to the axial direction.

5. The studless tire of claim 1, wherein
    the ratio θ2/θ1 of said inclination angle θ2 in the side rows to said inclination angle θ1 in the center row is at least 1.2 and at most 2.5.

6. The studless tire of claim 1, wherein
    each said lateral groove has zigzag groove walls,
    the inclination angles of said lateral grooves are at least 3 degrees and at most 30 degrees with respect to the axial direction, and
    the ratio θ2/θ1 of said inclination angle θ2 in the side rows to said inclination angle θ1 in the center row is at least 1.2 and at most 2.5.

* * * * *